(12) United States Patent
Bertheol et al.

(10) Patent No.: US 8,691,140 B2
(45) Date of Patent: Apr. 8, 2014

(54) PROCESS FOR INJECTION MOLDING OF THIN-WALLED PREFORM

(75) Inventors: Gilles Bertheol, Publier (FR); Jean-Paul Besson, Abondance (FR); Alain Colloud, Reyvroz (FR)

(73) Assignee: SA des Eaux Minerales d'Evian Saeme, Evian-les-Bains (FR)

( * ) Notice: Subject to any disclaimer, the term of this patent is extended or adjusted under 35 U.S.C. 154(b) by 0 days.

(21) Appl. No.: 13/332,330

(22) Filed: Dec. 20, 2011

(65) Prior Publication Data

US 2012/0094043 A1   Apr. 19, 2012

Related U.S. Application Data

(62) Division of application No. 12/281,761, filed as application No. PCT/EP2007/052195 on Mar. 8, 2007, now Pat. No. 8,100,687.

(30) Foreign Application Priority Data

Mar. 8, 2006  (FR) ..................................... 06 50807

(51) Int. Cl.
  *B29C 45/40*  (2006.01)
(52) U.S. Cl.
  USPC ....................................... 264/527; 264/328.16
(58) Field of Classification Search
  USPC ..................... 264/519, 537, 538, 327, 328.16
  See application file for complete search history.

(56) References Cited

U.S. PATENT DOCUMENTS

| | | | |
|---|---|---|---|
| 3,930,760 A | | 1/1976 | Winter |
| 4,467,994 A | * | 8/1984 | Sorensen ...................... 249/144 |
| 4,649,068 A | | 3/1987 | Collette |
| 4,977,005 A | * | 12/1990 | Krishnakumar et al. .. 428/36.92 |
| 4,997,692 A | * | 3/1991 | Yoshino ..................... 428/36.92 |
| 5,126,177 A | * | 6/1992 | Stenger ...................... 428/36.92 |
| 6,649,121 B1 | | 11/2003 | Hamamoto et al. |
| 7,169,342 B1 | * | 1/2007 | Brown et al. ................. 264/154 |
| 2001/0028930 A1 | * | 10/2001 | Koch et al. ............... 264/328.16 |

FOREIGN PATENT DOCUMENTS

| | | |
|---|---|---|
| EP | 1 180 424 A1 | 2/2002 |
| EP | 1 522 730 A1 | 4/2005 |
| EP | 1 529 958 A2 | 5/2005 |
| GB | 816967 | 7/1959 |

(Continued)

OTHER PUBLICATIONS

Search Report for GB 0717196.0, dated Dec. 12, 2007.

(Continued)

*Primary Examiner* — Jill Heitbrink

(74) *Attorney, Agent, or Firm* — Marshall, Gerstein & Borun LLP

(57) ABSTRACT

An injecting/blowing device includes a mold for injecting a thin-walled hollow preform capable of being transformed into a more voluminous hollow body. The mold includes a counter mold defining a cavity, a cure located in the cavity, and a preform impression located between the counter mold inner surface and the core which will receive the melt, at least two main preferential flow channels or at least two secondary preferential flow channels having a recessed zone at the surface of the core and the inner surface of the cavity. The main flow channels are located only at the impression zone corresponding to the zone for transforming the perform, and in the optional secondary flow channels are flow channels discontinuous from the main flow channel.

4 Claims, 3 Drawing Sheets

(56) References Cited

FOREIGN PATENT DOCUMENTS

| GB | 2 047 606 A | 12/1980 |
|---|---|---|
| JP | 6-200722 | 7/1994 |
| JP | 11-090975 A | 4/1999 |
| JP | 2002-292723 A | 10/2002 |

OTHER PUBLICATIONS

Preliminary Search Report for French Patent Application No. 06 50807, dated Nov. 2, 2006.

International Search Report for PCT/EP2007/052195, mailed Jul. 2, 2007.

Office Action for Chinese Patent Application No. 200780007350.9, dated May 27, 2010.

Office Action for European Patent Application No. 07 726 720.1-2307, dated Dec. 8, 2008.

International Preliminary Report on Patentability for PCT/EP2007/052195, dated Sep. 9, 2008.

* cited by examiner

PROCESS FOR INJECTION MOLDING OF THIN-WALLED PREFORM

TECHNICAL FIELD OF THE PRESENT INVENTION

The subject of the present invention is the injection molding of thin-walled parts, especially preforms.

The invention blow molding or ISBM (Injection Stretch Blow Molding) technique is well known and used for producing parts from thermoplastics. These parts may take the form of food containers, such as bottles.

The invention blow molding technique firstly comprises injection molding consisting of the following steps: drying of the material used if necessary before it melts; plasticization; injection of the material into the mold comprising a core and a countermold forming a molding cavity which corresponds to the molding impression; cooling; demolding; and removal of the preforms, and then blow molding comprising the following steps: reheating of the preforms; stretch-preblowing and blowing.

The injection molding aspect is more specially of interest within the context of the invention.

PRIOR ART

It is known that it is difficult to manufacture thin-walled parts by injection molding. This is because such manufacture starts with the injection molding of preforms which also have thin walls. This injection molding operation poses a number of technical problems. In particular, as the molten thermoplastic flows into the molding cavity, the pressure drop and the cooling of the material in contact with the mold require injection pressures that are higher the thinner the walls. These pressures become too high and exceed the technical capabilities of the materials used in the case of thin walls.

The notion of a "thin" wall is dependent on the shape of the part and on the material used. For example in the case of a bottle preform under conventional molding conditions, the thickness of the preform is limited by an apparent lack of material (incomplete molding) occurring in the zone opposite the point where the molten material is injected into the mold.

This is the case for all thermoplastics, with thickness limits that vary depending on the melt viscosity of the material and on the shape of the part.

In the case of a preform made of polyethylene terephthalate (PET) for example, it is difficult to go below a thickness of 2.5 mm for a length of about 120 mm.

Patent Application WO-A-97/13696 describes a method and an apparatus for producing multilayer preforms by injection blow molding. The patent application stresses the difficulty of obtaining thin-walled preforms using conventional injection molds. This is because when such molds are used, the molten material encounters a relatively high resistance to the flow and requires the use of high injection pressures for injection into the cavity of the mold. To remedy these drawbacks, indentations were inserted into the cavity of the mold corresponding to the internal surface of the countermold. These indentations are distributed equiangularly in the cavity and extend from the injection point to the opposite end of the mold.

Also known is Japanese Patent Application JP 11-090975 which describes a multilayer preform, a process of manufacturing such a preform and a multilayer container obtained from such a preform.

The preform has a first layer made of a polyester injected into a mold, to form the inner layer. Recycled polyester is then injected to form the outer layer of the preform. Ribs are provided on the first layer so as to be able to produce thin-walled multilayer preforms. However, these ribs are provided over the entire height of the preform, between the bottom and the neck of the preform.

Likewise, the core has, on its surface, depression zones produced in the zone corresponding to the entire height of the preform. This configuration is suitable for multilayer preforms. Furthermore, the ribs provided over the entire height of the preform increase the weight of this preform and therefore the weight of the thin-walled part obtained from this preform.

Also known is European Patent EP 1 180 424 which describes a process for manufacturing objects using a step of injection molding an outer preform from a first resin and then a step of injection molding an internal preform on the inside of the first preform, using a second resin. The process then includes a blowing step.

The core of the injection mold for molding the internal preform has, on its outer periphery, a plurality of vertical channels arranged at regular intervals, so that the thicker regions formed inside the internal preform extend over the entire body of the preform. Such thicker regions prevent any thinning-down of the bottle formed in the central and upper zones.

Here again, the ribs provided over the entire height of the preform increase the weight of this preform and therefore the weight of the thin-walled part obtained from this preform.

Finally, U.S. Pat. No. 4,649,068 describes a process and a preform for the injection blow molding of containers closed by a cap and intended to be filled with hot products. The preform has, only in the neck region, longitudinal ribs uniformly distributed over its inner perimeter. These ribs axially reinforce the thread and prevent the neck from deforming under pressure when the bottle is filled with a hot product.

DESCRIPTION OF THE INVENTION

The objective of the present invention is to obtain thin-walled parts, especially preforms, and constitutes an alternative solution to the solutions of the prior art.

More particularly, the objective of the present invention is to obtain preforms enabling the weight of the thin-walled part obtained, such as a bottle, to be minimized, while still maintaining its mechanical properties.

The invention is based on technical principles for producing in particular thin-walled preforms by the molding of thermoplastics. These technical principles may be used separately or in combination so as to obtain the expected result:
  creation of preferential flow channels (PFCs) in the mold (FIG. 1) enabling the cavity to be filled more rapidly and with less of a temperature drop of the material and less of a pressure drop;
  by the creation of depression zones, by machining the surface of the core, which allow preferential flow;
  by the modification of the surface finish of the core and/or of the cavity (differential treatment between the preferential flow zones and the other portions of the preform);
  use of heating molding pieces allowing better flow of the material and less cooling during the material flow step. These heating pieces must be very rapidly heated and cooled, depending on the phase during the molding step.

One of the aspects of the invention relates to an injection molding device comprising at least one mold that can be used for the injection molding of a thin-walled hollow preform that can be converted into a more voluminous hollow body by blow molding, said mold comprising:

a countermold defining the internal surface of the cavity;
a core located in the cavity and spaced away from said internal surface;
a preform impression located between the internal surface of the countermold and the core, which impression will receive the molten material;
at least two main preferential flow channels (PFCs); and
optionally at least two secondary preferential flow channels (PFCs), each PFC being bounded, on the one hand, by at least one depression zone on the surface of the core and, on the other hand, by the internal surface of the cavity, aid device being characterized in that:
the main PFCs are located only in that zone of the impression which corresponds to the transition zone of the preform;
and in that the optional secondary PFCs are discontinuous, separate from the main PFCs, and located in those zones of the impression which correspond to the bottom and/or to the body and/or to the neck of the preform.

Thus, according to the invention, the PFCs do not extend over the entire height of the preform and, in particular, are not necessarily present within the body of the preform.

Such a device allows a preform to be produced while minimizing the thickness of the transition zone of the preform, although this zone is subjected to high mechanical stresses, for example when stacking bottles. The person skilled in the art has therefore overcome a preconception that would have encouraged him not to thin down the transition zone—a particularly sensitive zone—so as not to risk reducing the resistance of the bottle to mechanical stresses. The PFCs placed according to the invention during injection allow the subsequent blow molding operation to be carried out despite a small thickness in the transition zone. The PFCs according to the invention make it possible to obtain a lightweight thin-walled part, for example a bottle, while still maintaining its mechanical properties.

Another subject of the present invention is a core that can be used for the injection molding of thin-walled preforms, characterized in that it includes, on the surface, main depression zones produced only in the zone corresponding to the transition zone of the perform, and optionally discontinuous secondary depression zones, separate from the main depression zones and located in the zone corresponding to the bottom and/or to the body and/or to the neck of the preform.

The invention also relates to a thin-walled preform, characterized in that it comprises main variable-thickness zones located only in its transition zone and optionally discontinuous secondary variable-thickness zones, separate from the main variable-thickness zones and located on its bottom and/or its body and/or its neck.

Thus, the invention described in the present application makes it possible, after the preforms have been blow molded, to produce lightweight flasks, while still maintaining limited overall stretch ratios (overall stretch ratio: the longitudinal stretch ratio (corresponding to the length of the final blow-molded object/length of the preform ratio) multiplied by the diametral stretch ratio (corresponding to the diameter of the blow-molded final object/diameter of the preform ratio)), while lightening existing preforms. It is possible to produce several weights of preforms by changing only the molding's central portion (core). This change of core also has an economic advantage since, in the injection molding technique, the cores represent only 10 to 15% of the cost of the mold. By providing a greater variation in the thickness of the preforms, it is therefore possible to produce a wider range of preform weights merely by changing the cores.

According to yet another aspect, the invention relates to a process for the injection molding of thin-walled preforms, which comprises the following steps:
the molten material is injected into a mold comprising a core as described above;
the preform is cooled down to a temperature at which the material no longer changes;
the preform is then demolded.

Such a process makes it possible to reduce the cycle times for molding thin-walled preforms, while reducing the risks of incomplete molding, and to injection mold highly viscous thermoplastics, in molds shaped so as to produce thin-walled preforms.

The term "mold" used within the context of the present invention refers to a two-part device comprising a fixed stage, having the cavities or countermolds, the movement of which is provided by the closure system and a plate for supporting the cores. The fixed stage also includes a plasticizing screw, where the material to be injected passes from the solid state to the molten state. The molten material is injected at the injection point after the injection mold has been closed and clamped.

The term "impression" used within the context of the present invention refers to the space lying between the internal wall of the countermold and the core.

According to one particular embodiment of the invention, the mold is characterized by the average thickness of the impression being equal to or less than a+L/b, i.e.:

$$w_{av} \leq a + L/b$$

with $1.20 < a < 1.4$ and $88 < b < 98$ where:

$$w_{av} = \frac{1}{L} \int_{\varphi}^{L} w_u \, du$$

where:
L is the total length in question of the preform (cf. FIG. 6);
u is the curvilinear abscissa at each point on the perform; and
$w_u$ is the local thickness at each point on the preform.

The term "preferential flow channels or PFCs" used within the context of the present invention refers to a volume lying between the internal wall of the countermold and the depression zones on the surface of the core. These channels allow greater flow of molten material compared with that in the zones outside the PFCs. When not specified, the term "PFC" covers both main PFCs and secondary PFCs.

The PFCS may be obtained by modifying the surface finish of the core or by machining the latter.

According to a preferred embodiment of the invention, the PFCs are symmetrical.

According to an even more preferential embodiment of the invention, the PFCs are symmetrical and localized equiangularly around the circumference of the preform.

The term "equiangularly" used within the context of the present invention refers to objects being distributed at identical angles around a circumference.

According to the invention, the main PFCs are located only in that zone of the impression which corresponds to the transition zone of the preform.

According to one particular embodiment of the invention, discontinuous secondary PFCs are provided, which are separate from the main PFCs and may be located in those zones of the impression which correspond to the bottom and/or to the body and/or to the neck of the preform.

According to another particular embodiment of the invention, the number of PFCs in the mold is between 2 and 12, at least two being provided in the zone corresponding to the transition zone of the preform.

In a most preferential aspect for implementing the invention, the mold has 2 to 6 PFCs, at least two being provided in the zone corresponding to the transition zone of the preform.

According to one particular embodiment of the invention, the mold has PFCs which, when they are observed in cross section, are of rectangular, polygonal, oblong or evolutive shape.

According to another aspect of the invention, the mold includes PFCs of longitudinal, helical and/or evolutive orientation.

According to another embodiment of the invention, the mold further includes at least two depressions in the internal surface of the cavity.

The term "preform" used within the context of the present invention is defined by three different zones: the body, the transition zone and the neck. The preform is obtained by filling the impression with molten material injected into the mold.

According to the invention, the preform comprises main variable-thickness zones located only in its transition zone, and discontinuous secondary variable-thickness zones, separate from the main variable-thickness zones and located on its bottom and/or its body and/or its neck.

According to one particular embodiment of the invention, the variable-thickness zones are symmetrical.

According to an even more preferential embodiment of the invention, the variable-thickness zones are symmetrical and distributed equiangularly over the circumference of the preform.

The term "variable-thickness zone" used within the context of the present invention refers to a larger volume of the preform, corresponding to PFCs filled with the molten and cooled material. When this is not specified, the term "variable-thickness zone" covers both main variable-thickness zones and secondary variable-thickness zones.

The preform has an average thickness ($w_{av}$) defined by $w_{av} \leq a + L/b$, with $1.20 < a < 1.36$ and $88 < b < 98$, L being the total length in question of the preform, $w_{av}$ being calculated as indicated above.

According to another particular embodiment of the invention, the variable-thickness zones of the preform are located longitudinally, helically or evolutively with respect to the axis of the preform.

Another aspect of the present invention relates to the core, which can be used for the injection molding of thin-walled preforms and includes, on the surface, main depression zones produced only in the zone corresponding to the transition zone of the perform, and optionally discontinuous secondary depression zones, separate from the main depression zones and located in the zone corresponding to the bottom and/or to the body and/or to the neck of the preform.

The term "depression zone" used within the context of the present invention relates a depressed zone in the surface of the core, which may be created by machining the core or complete molding of the core. When this is not specified, the term "depression zone" covers both main depression zones and secondary depression zones.

According to one particular embodiment of the present invention, the depressions on the surface of the core are obtained by machining or by surface treatment, said zones thus modified being symmetrical.

According to a preferential embodiment of the invention, the depression zones in the surface of the core are symmetrical and distributed equiangularly over the circumference of the core.

According to yet another aspect of the present invention, the core has 2 to 12 depression zones and very preferentially has 2 to 6 depression zones, at least two being provided in the zone corresponding to the transition zone of the preform.

According to one embodiment of the invention, the machining operations carried out on the core result in features that may be of rectangular, polygonal, oblong or evolutive shape with respect to the axis of the core.

Within the context of the preset invention, the machining carried out on the surface of the core may allow the shape of the machine feature created to evolve, so that the shape is better adapted to the profile of the preform, in which case the machine feature is then said to have an "evolutive" shape.

Another aspect of the present invention relates to a process for the injection molding of thin-walled preforms, which comprises the following steps: the molten material is injected into a mold comprising a core as described above; the preform is cooled down to a temperature at which the material no longer changes; and the preform is then demolded.

In a preferential aspect of the invention, the core and/or the cavity are/is heated during at least part of the step of injecting the molten material into the mold.

Very preferentially, the heating is applied in specific zones of the core and/or of the cavity.

The present invention will be described more precisely in different implementations given by way of nonlimiting example and illustrated by the following figures.

DETAILED DESCRIPTION OF THE INVENTION

Figure 1:
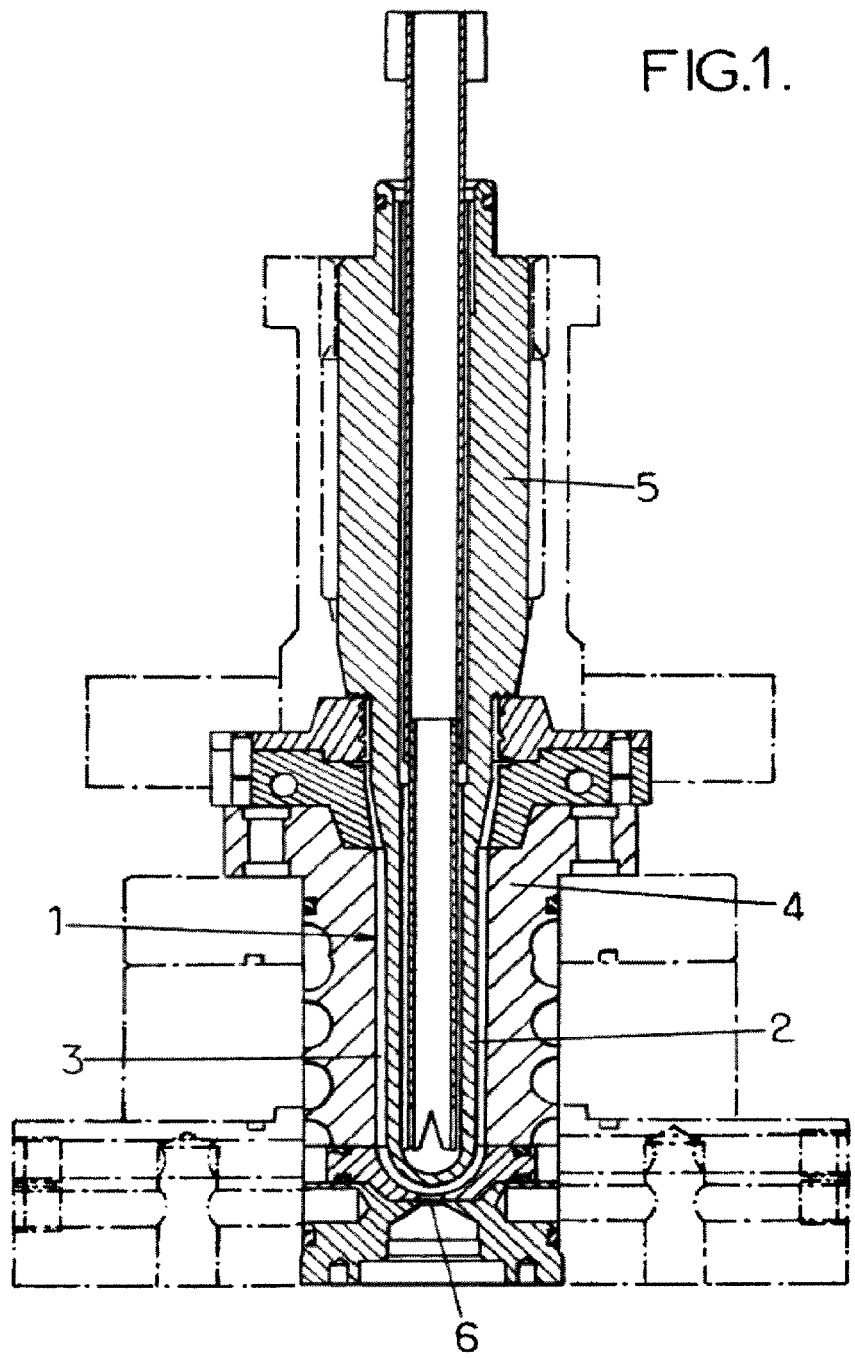
FIG. 1 shows a longitudinal section along an axis not having the PFCs of a closed mold according to the invention.

FIG. 1 shows a mold according to the invention comprising two parts: a fixed part, also called the cavity support or countermold 4, and a moving part 5 supporting the cores 2. The internal wall 1 of the countermold 4 and the core 2 define a cavity 3 into which the molten material will be injected via the injection point 6.

Figure 2:
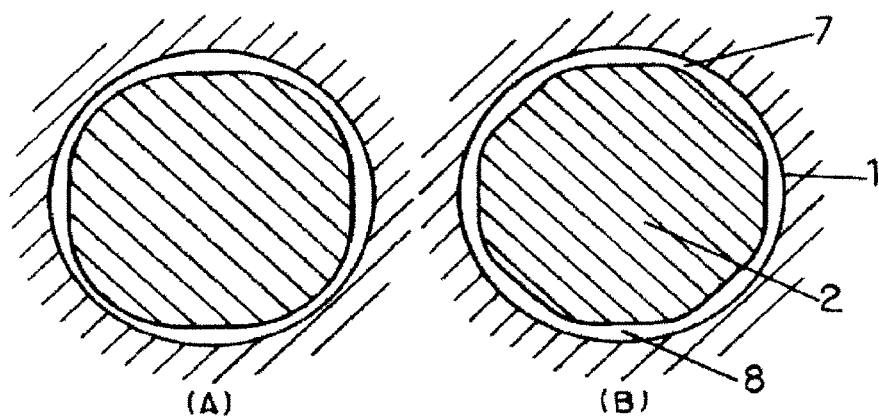
FIG. 2 (A and B) shows another longitudinal section of a mold according to the invention in the zone corresponding to the transition zone of the preform.

FIG. 2 shows more precisely the internal wall 1 of the countermold 4 and the core 2 which together define a cavity 3 corresponding to the impression 7 and the main PFCs 8.

According to the invention, the main PFCs 8 (FIG. 2 A and B) are bounded by a depression zone on the surface of the core 2, said depression zone being produced in the zone corresponding to the transition zone of the preform, and the internal surface 1 of the countermold 4.

Figure 3:
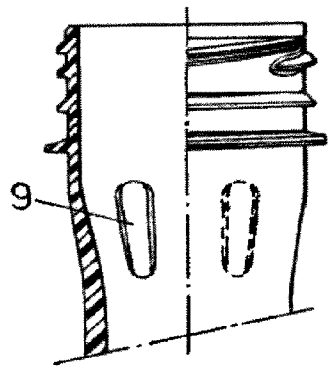
FIG. 3 shows a partial longitudinal section of a preform according to the invention, depicting the neck and the transition zone.
Figure 6:
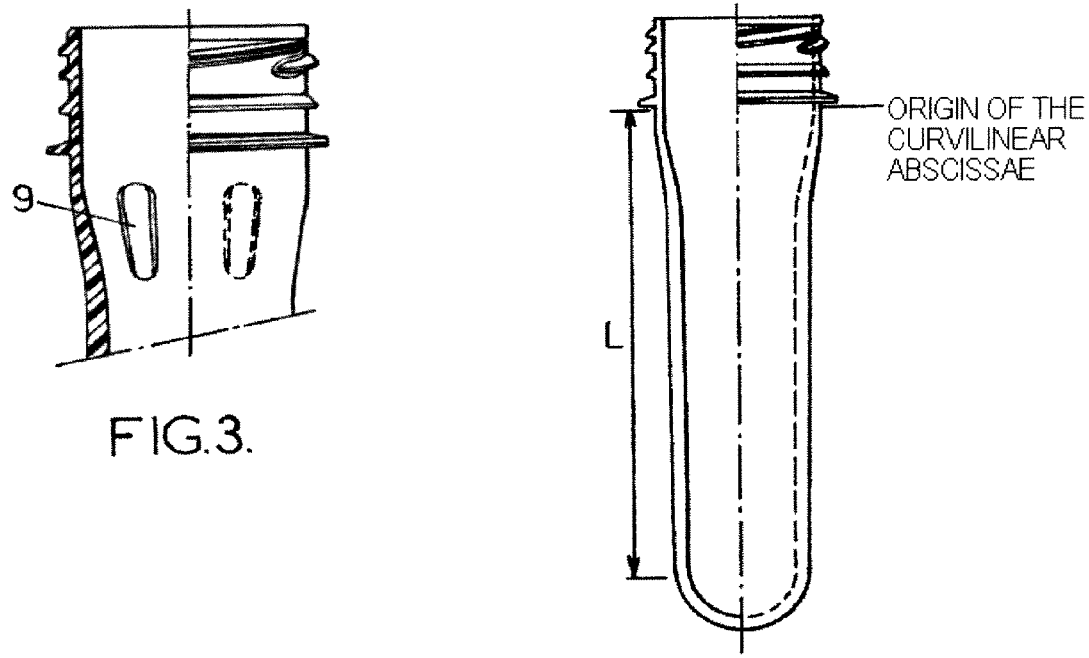
FIG. 6 shows the various parameters involved for calculating the average minimum thickness of the preform according to the invention.

FIG. 3 shows a first embodiment of the invention in which the preform has main variable-thickness zones 9 located only in its transition zone.

Figure 4:
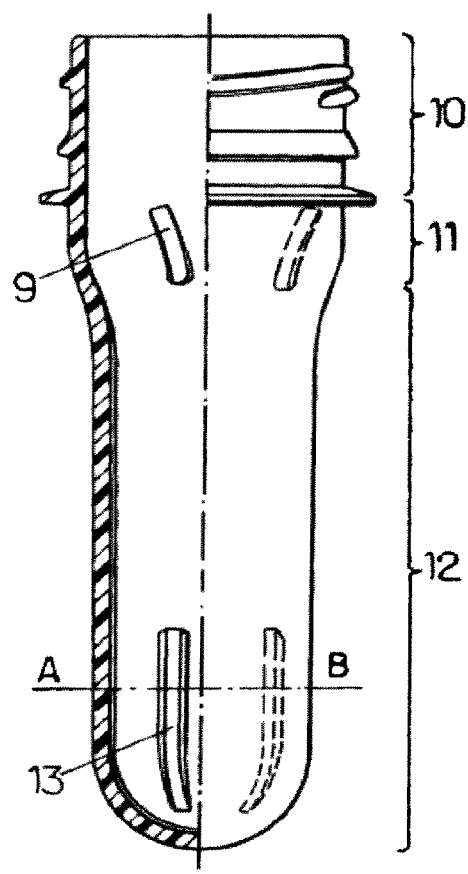
FIG. 4 shows a longitudinal section of another embodiment of a preform according to the invention.

FIG. 4 shows a second embodiment of the invention. The preform has a neck 10, a transition zone 11 and a body 12. According to the invention, the preform includes main variable-thickness zones 9 in is transition zone 11 and discontinuous secondary variable-thickness zones 13, separate from the main variable-thickness zones 9 and located in the lower part of the body 12.

Figure 5:
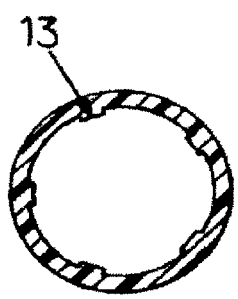
FIG. 5 shows a cross section in the plane AB of the preform according to FIG. 4.

The secondary variable-thickness zones 13 may be seen in FIG. 5 in cross section in the plane AB of FIG. 4.

The following examples, given without being limiting, will make it clearly understood how the invention can be put into practice and will bring out its special features.

EXAMPLE 1

Conventional PET Preform (Weight 17 g; Length 90.44 mm) and Process for Obtaining It Device Employed The preforms are produced on injection molding machines equipped with a multicavity mold.

The PET material, predried so as to prevent hydrolysis as it undergoes melting, is transferred under gravity to the plasticization screw where it progressively passes from the solid state to the molten state. This plasticization must be carried out according to the rules of the art so as to achieve good homogeneity of the melt. The molten material is transferred forward of the screw by rotation of the screw, increase in the temperature and increase in pressure: extrusion.

There is a build-up of molten material forward of the screw, this material being transferred into the injection pot by the valve passing into the transfer position, and an amount of material corresponding to one complete mold (preform weight, in this case 17 g, multiplied by the number of cavities) is transferred. After this material has been transferred, the valve is placed in the injection position.

The viscosity of the molten material will depend on the temperature, these temperatures typically being between 230° C. and 280° C., more precisely between 245° C. and 270° C.

The injection takes place after the injection mold has been closed and clamped, the clamping forces having to be sufficient to prevent flash on the preforms, but not too high so as not to damage the tools. In the case of a 48-cavity mold, the forces employed are between 200 and 300 tonnes, ideally less than 250 tonnes.

The molten material is introduced into the cavities of the mold after opening the shut-off valves. Proper filling will depend on the flow, i.e. on the control of the injection speed and pressure parameters and on the moment when the machine passes from the injection phase to the holding phase.

The pressure range used is below 150 bar and more ideally between 100 and 130 bar. The filling speeds are 40 mm per second±20%.

The hot runners of the mold are at a temperature of generally between 270° C. and 290° C., this being able to make the material relatively fluid, and therefore improving the flow. However, increasing the temperature of the material above 290° C. will cause not inconsiderable chemical degradation and injection point defects.

The material sets upon contact with the cold walls of the mold (cavity and core). The quality of the injection will depend on the amount injected per unit of time. With the current injection molding processes, the injection rate is 8 to 12 g per second, depending on the type of PET resin—this injection speed allows proper filling of the cavity, but also of the neck. To guarantee this injection speed, there is a minimum thickness of the preform to be respected, which will depend on its length. In the case here, if $w_{av} < 1.36 + L/93.76$, there is a risk of incomplete necks appearing—a defect termed a critical defect.

After the cavity has been filled, the material is maintained under pressure for a certain time, called the holding time, so as to compensate for the shrinkage due to the material cooling.

The final step before demolding the preform is the cooling of the latter. The material must have solidified sufficiently not to undergo deformation and the center of the core must be below the crystallization temperature.

The cooling time will depend on the thickness of the preform, and this satisfies the following equation:

$$t_c = (w^2/\pi^2 a) \ln[(8/\pi^2)(T_i - T_s)/(T_d - T_s)]$$

where
$t_c$=cooling time (in s);
$w$=thickness (in mm);
$a$=thermal diffusion coefficient;
$T_s$=surface temperature of the cavity;
$T_i$=injection temperature;
$T_d$=average temperature of the preform at demolding.

EXAMPLE 2

Preform According to the Invention (FIG. 3)

The lightening of containers requires designing preforms of ever thinner wall thickness, the thickness/length ratio of which becomes less than 2. In this case, the design of the preform will include PFCs for allowing the cavity to be filled. The manufacturing process is the same as that presented above.

The lightening of the preform is achieved by changing the core (limited investment cost), thereby reducing the thickness of the preform.

Thus, for a preform of the same length as that of example 1, namely 90.44 mm, it will be possible to produce a lightened preform weighing 15.35 g. The average thickness of this preform will be 1.8 mm and this can be filled only in the presence of the PFCs in the mold.

The addition of the PFCs allows the injection pressure to be brought back down to between 100 and 130 bar, compared with a maximum pressure of 150 bar, which maximum pressure, without the addition of PFCs, nevertheless does not ensure filling of the cavity for an average thickness of 1.8 mm without the risk of having incomplete necks. In the present case, for an average thickness of 1.8 mm and a length of 90.44 mm of the preform, it is verified that the condition $w_{ab} < a + L/b$ with $a = 1.36$ and $b = 93.76$ is satisfied.

The invention claimed is:
1. A process for the injection molding of a thin-walled preform comprising a neck, a transition zone and a body, the injection molding process comprising:
   injecting a molten material into a mold comprising a core, a countermold having a cavity for receiving the core, and a preform impression disposed between an internal surface of the countermold and the core, the core including main depression zones produced only in a zone corresponding to the transition zone of the preform, wherein the preform impression has an average thickness ($w_{av}$) in millimeter equal to or less than $a+L/b$ ($w_{av} \leq +L/b$), with $1.20 < a < 1.40$ and $88 < b < 98$, with L being a total length of the preform in millimeter, and where $$w_{av} = \frac{1}{L}\int_{\phi}^{L} w_u u\, du$$

with u being a curvilinear abscissa at each point on the preform, and $w_u$ being a local thickness at each point on the preform in millimeter;

arranging the mold to produce main variable-thickness zones extending inwardly only in the transition zone of the preform;

cooling the preform down to a temperature at which the material no longer changes;

demolding the preform, the preform having an average thickness (wav) defined by $wav \leq a + L/b$, with $1.20 < a < 1.36$ and $88 < b < 98$.

2. The injection molding process as claimed in claim 1, wherein at least one of the core and the cavity is heated during at least part of the step of injecting the molten material into the mold.

3. The process as claimed in claim 2, wherein the heating is applied in specific zones of the core and/or of the cavity.

4. The injection molding process as claimed in claim 1, including injecting the molten material on the core, providing the core with discontinuous secondary depression zones, arranging the secondary depression zones to be separate from the main depression zones and located in a zone corresponding to a bottom, the body or the neck of the preform, and arranging the mold to produce, in the preform, discontinuous secondary variable-thickness zones, the secondary variable thickness zones separate from the main variable-thickness zones and located on at least one of the bottom, the body, or the neck of the preform.

* * * * *